(12) United States Patent
Wada et al.

(10) Patent No.: US 12,240,350 B2
(45) Date of Patent: Mar. 4, 2025

(54) ELECTRIC VEHICLE

(71) Applicant: YAMAHA HATSUDOKI KABUSHIKI KAISHA, Iwata (JP)

(72) Inventors: Tomoki Wada, Shizuoka (JP); Soraki Ogawa, Shizuoka (JP); Masayuki Momoi, Shizuoka (JP); Takaaki Miyazaki, Shizuoka (JP); Yoshihiro Yamasaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 307 days.

(21) Appl. No.: 17/864,598

(22) Filed: Jul. 14, 2022

(65) Prior Publication Data

US 2023/0024960 A1    Jan. 26, 2023

(30) Foreign Application Priority Data

Jul. 20, 2021  (JP) .................................. 2021-119982

(51) Int. Cl.
*B60L 58/26*      (2019.01)
*B60L 53/16*      (2019.01)
(Continued)

(52) U.S. Cl.
CPC .............. *B60L 58/26* (2019.02); *B60L 53/22* (2019.02); *B62J 43/16* (2020.02); *B62J 45/20* (2020.02);
(Continued)

(58) Field of Classification Search
CPC ...... B60L 2210/30; B60L 50/64; B60L 53/16; B60L 53/22; B60L 58/26; B62J 43/16; B62J 45/20; H01M 10/46; H01M 10/613; H01M 10/625; H01M 10/6563; H01M 2220/20; H01M 50/204; H01M 50/24;
(Continued)

(56) References Cited

U.S. PATENT DOCUMENTS 6,624,610 B1    9/2003  Ono et al.
9,166,259 B2   10/2015  Ronning et al.
(Continued)

FOREIGN PATENT DOCUMENTS

CN    103237719 B    *  1/2016   ............... B60K 1/04
CN    111278722 A       6/2020
(Continued)

OTHER PUBLICATIONS

Official Communication issued in corresponding European Patent Application No. 22186018.2, mailed on Nov. 15, 2022.
Office Action in IN 202224041041, mailed Feb. 23, 2023, 6 pages.

*Primary Examiner* — Babar Sarwar
(74) *Attorney, Agent, or Firm* — Keating & Bennett, LLP

(57) ABSTRACT

An electric vehicle includes a wheel, an electric motor to drive the wheel, a battery to supply electric power to the electric motor, the battery including battery cells and a battery casing to house the battery cells, an onboard charger to charge the battery, the onboard charger being opposed to and spaced apart from an outer surface of the battery casing so that an air flow path exists between the onboard charger and the outer surface of the battery casing, and a cooling fan to generate a flow of air passing through the air flow path between the onboard charger and the battery casing.

16 Claims, 6 Drawing Sheets

(51) Int. Cl.
*B60L 53/22* (2019.01)
*B62J 43/16* (2020.01)
*B62J 45/20* (2020.01)
*H01M 10/46* (2006.01)
*H01M 10/613* (2014.01)
*H01M 10/625* (2014.01)
*H01M 10/6563* (2014.01)
*H01M 50/204* (2021.01)
*H01M 50/24* (2021.01)
*H01M 50/249* (2021.01)
*H02J 7/00* (2006.01)

(52) U.S. Cl.
CPC ......... *H01M 10/46* (2013.01); *H01M 10/613* (2015.04); *H01M 10/625* (2015.04); *H01M 10/6563* (2015.04); *H01M 50/204* (2021.01); *H01M 50/24* (2021.01); *H01M 50/249* (2021.01); *H02J 7/0013* (2013.01); *H02J 7/0042* (2013.01); *H02J 7/0063* (2013.01); *B60L 53/16* (2019.02); *B60L 2210/30* (2013.01); *H01M 2220/20* (2013.01); *H02J 2207/20* (2020.01)

(58) Field of Classification Search
CPC .. H01M 50/249; H02J 2207/20; H02J 7/0013; H02J 7/0042; H02J 7/0063; Y02T 10/70
See application file for complete search history.

(56) References Cited

U.S. PATENT DOCUMENTS

| | | | |
|---|---|---|---|
| 9,768,661 B2 * | 9/2017 | Matsuda | B62K 11/04 |
| 2010/0078251 A1 | 4/2010 | Nishiura et al. | |
| 2014/0356652 A1 | 12/2014 | Boddakayala et al. | |
| 2014/0367183 A1 | 12/2014 | Matsuda | |
| 2017/0282748 A1 * | 10/2017 | Yamamoto | B60L 50/71 |
| 2017/0282749 A1 * | 10/2017 | Yamamoto | H01M 8/04201 |
| 2021/0001943 A1 * | 1/2021 | Ikeda | B62K 11/02 |

FOREIGN PATENT DOCUMENTS

| | | | | |
|---|---|---|---|---|
| EP | 1108585 A2 * | 6/2001 | | B60K 11/04 |
| EP | 2077220 A2 * | 7/2009 | | B62J 17/06 |
| EP | 2 799 318 A1 | 11/2014 | | |
| JP | 11-180169 A | 7/1999 | | |
| JP | 2000-253591 A | 9/2000 | | |
| JP | 5167055 B2 | 3/2013 | | |
| JP | 2015-103486 A | 6/2015 | | |
| WO | WO-2012066601 A1 * | 5/2012 | | B62K 11/00 |
| WO | 2013061386 A1 | 5/2013 | | |
| WO | WO-2019186952 A1 * | 10/2019 | | B62J 1/08 |

* cited by examiner

FIG.4
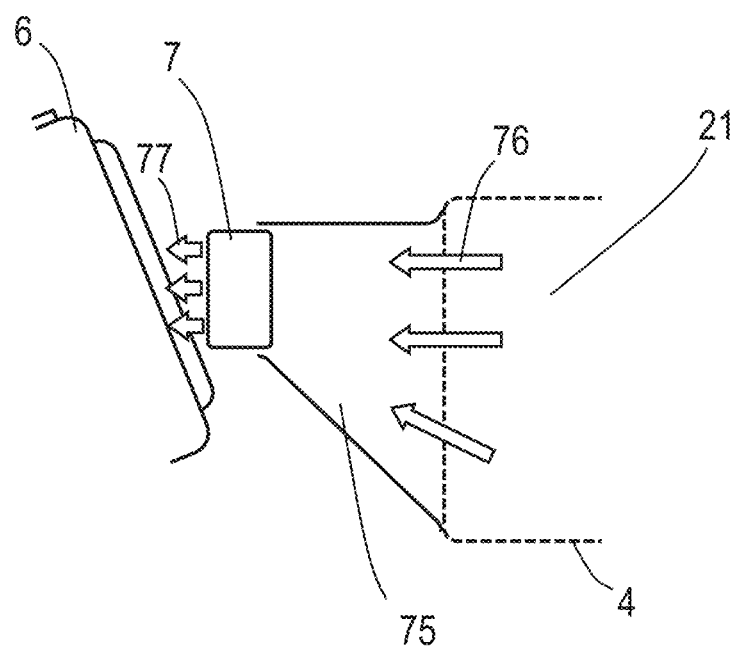
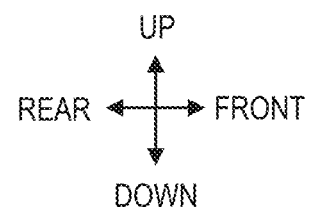

FIG.6
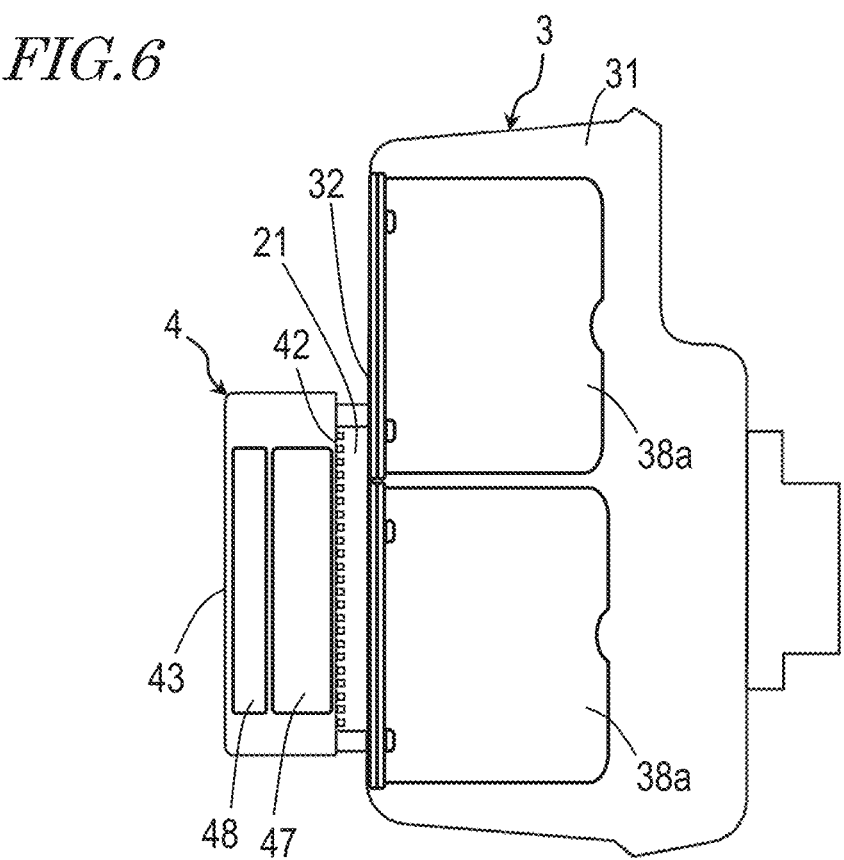
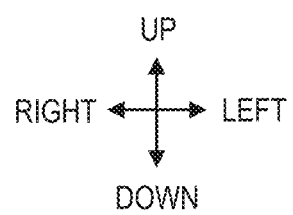

ELECTRIC VEHICLE

CROSS REFERENCE TO RELATED APPLICATIONS

This application claims the benefit of priority to Japanese Patent Application No. 2021-119982 filed on Jul. 20, 2021. The entire contents of this application are hereby incorporated herein by reference.

BACKGROUND OF THE INVENTION

1. Field of the Invention

The present invention relates to an electric vehicle that travels using an electric motor.

2. Description of the Related Art

There are electric vehicles that travel using an electric motor as their driving source (see, for example, Japanese Laid-Open Patent Publication No. 2000-253591). The electric motor rotates with electric power which is supplied from a battery installed in such an electric vehicle. As the rotation of the electric motor is transmitted to the wheels, the electric vehicles can travel.

Inside an electric vehicle, a multitude of components that emit heat are mounted. Such heat-emitting components may be cooled through forced air cooling by using a cooling fan, for example.

However, when a cooling fan is attached to each such component to be cooled, a large total space will be required in order to accommodate the cooling fans. Moreover, the increased number of components results in increased assembly man-hours and increased cost.

SUMMARY OF THE INVENTION

Preferred embodiments of the present invention provide electric vehicles that each saves space and reduces costs with respect to cooling structures.

An electric vehicle according to a preferred embodiment of the present invention includes a wheel, an electric motor to drive the wheel, a battery to supply electric power to the electric motor and including a plurality of battery cells and a battery casing that houses the plurality of battery cells, an onboard charger to charge the battery and opposed to and spaced apart from an outer surface of the battery casing so that an air flow path exists between the onboard charger and the outer surface of the battery casing, and a cooling fan to generate a flow of air passing through the air flow path between the onboard charger and the outer surface of the battery casing.

The onboard charger and the outer surface of the battery casing are opposed to each other, and a gap between the onboard charger and the outer surface of the battery casing is utilized as an air flow path for forced air cooling such that both of the onboard charger and the battery are cooled by using the same cooling fan, thus saving space. Especially in the case where the vehicle is a two-wheeled electric vehicle, a large number of components need to be provided within a limited space in a vehicle body, and therefore the space saving is significantly advantageous. Allowing both of the onboard charger and the battery to be cooled with the same cooling fan also reduces costs.

According to a preferred embodiment of the present invention, the electric vehicle may further include a controller to generate a driving current to be supplied to the electric motor from an output current of the battery, and the cooling fan may generate a flow of air blowing toward the controller.

By cooling the onboard charger, the battery, and the controller with the same cooling fan, space is saved and costs are reduced.

According to a preferred embodiment of the present invention, along a direction of the flow of air generated by the cooling fan, the air flow path between the onboard charger and the battery may be located upstream of the cooling fan, and the controller may be located downstream of the cooling fan, and the cooling fan may suck in air within the air flow path to generate the flow of air blowing toward the controller.

During travel of the vehicle, the controller is generally higher in temperature than the battery. Moreover, during travel of the vehicle, the onboard charger is not used and therefore the onboard charger does not generate heat. Therefore, the controller is cooled even by receiving the flow of air that is generated by the cooling fan sucking the air existing in the air flow path between the battery and the onboard charger.

On the other hand, during charging of the battery, the onboard charger generates heat, but the vehicle is parked, and thus there is no need to cool the controller. Therefore, even if the flow of air that is generated by the cooling fan sucking the air existing in the air flow path between the onboard charger and the battery strikes the controller, the controller will not be affected.

Thus, efficient cooling is achieved during travel of the vehicle and during charging of the battery even by using the same cooling fan for the onboard charger, the battery, and the controller.

According to a preferred embodiment of the present invention, the electric vehicle may further include a duct to lead air in the air flow path between the onboard charger and the battery to the cooling fan.

The cooling fan is able to efficiently suck the air within the air flow path between the onboard charger and the battery, thus allowing the onboard charger and the battery to be efficiently cooled.

According to a preferred embodiment of the present invention, the onboard charger may include a housing including a first wall that is opposed to the battery casing, and the battery casing may include a second wall that is opposed to the first wall so that the air flow path is created between the second wall and the first wall.

By creating the air flow path for forced air cooling between the wall of the onboard charger and the wall of the battery being opposed to each other, both of the onboard charger and the battery are cooled with the same cooling fan.

According to a preferred embodiment of the present invention, the onboard charger may include a power circuit to convert an externally-input AC current into DC current, the housing of the onboard charger may further include a third wall located at an opposite side of a side that is opposed to the second wall of the battery, and, within the onboard charger, the power circuit may be closer to the first wall than to the third wall.

By locating the power circuit that generates a large amount of heat at a position close to the air flow path between the onboard charger and the battery, efficient heat radiation is performed.

According to a preferred embodiment of the present invention, the battery may further include a heat transmitter to conduct heat generated inside the battery to the second wall.

Allowing heat generated inside the battery to be conducted to the second wall permits efficient heat radiation.

According to a preferred embodiment of the present invention, each of the housing of the onboard charger and the battery casing may be waterproof.

This prevents rainwater or the like from intruding inside the onboard charger and inside the battery.

According to a preferred embodiment of the present invention, a front portion of the air flow path between the onboard charger and the battery may be open to an outside of the air flow path.

This allows a portion of the wind received from the front of the vehicle during travel of the vehicle to be taken into the air flow path, and this portion of the wind is utilized for air cooling.

According to a preferred embodiment of the present invention, the controller may be attached to the electric motor with a gap existing between a portion of the controller and the electric motor.

With an integrated mechanical and electrical structure in which the controller is attached to the electric motor, the high-voltage wiring between the controller and the electric motor is shortened, thus reducing costs and weight. Although a large amount of heat is generated from the electric motor, because the gap exists between the controller and the electric motor in this integrated mechanical and electrical structure, the amount of heat that is transmitted from the electric motor to the controller is reduced.

According to a preferred embodiment of the present invention, the controller may be attached to the electric motor via a bracket.

By using the bracket, the controller is attached to the electric motor so that the gap exists between a portion of the controller and the electric motor.

According to a preferred embodiment of the present invention, the electric vehicle may be a straddled electric vehicle.

In a straddled electric vehicle in which a large number of components need to be provided within a limited space in the vehicle body, space is saved and costs are reduced with respect to cooling structures for the components.

The onboard charger and the outer surface of the battery casing are opposed to each other, and a gap between the onboard charger and the outer surface of the battery casing is utilized as an air flow path for forced air cooling, such that both of the onboard charger and the battery are cooled by using the same cooling fan, thus saving space. Especially in the case where the vehicle is a two-wheeled electric vehicle, a large number of components need to be provided within a limited space in a vehicle body, and therefore the space saving is significantly advantageous. Allowing both of the onboard charger and the battery to be cooled with the same cooling fan also reduces costs.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a diagram showing a cross section of a duct 75 according to a preferred embodiment of the present invention.

FIG. 6 is a diagram showing another example of heat-transmitting members included in the battery 3 according to a preferred embodiment of the present invention.

DETAILED DESCRIPTION OF THE PREFERRED EMBODIMENTS

Figure 1:
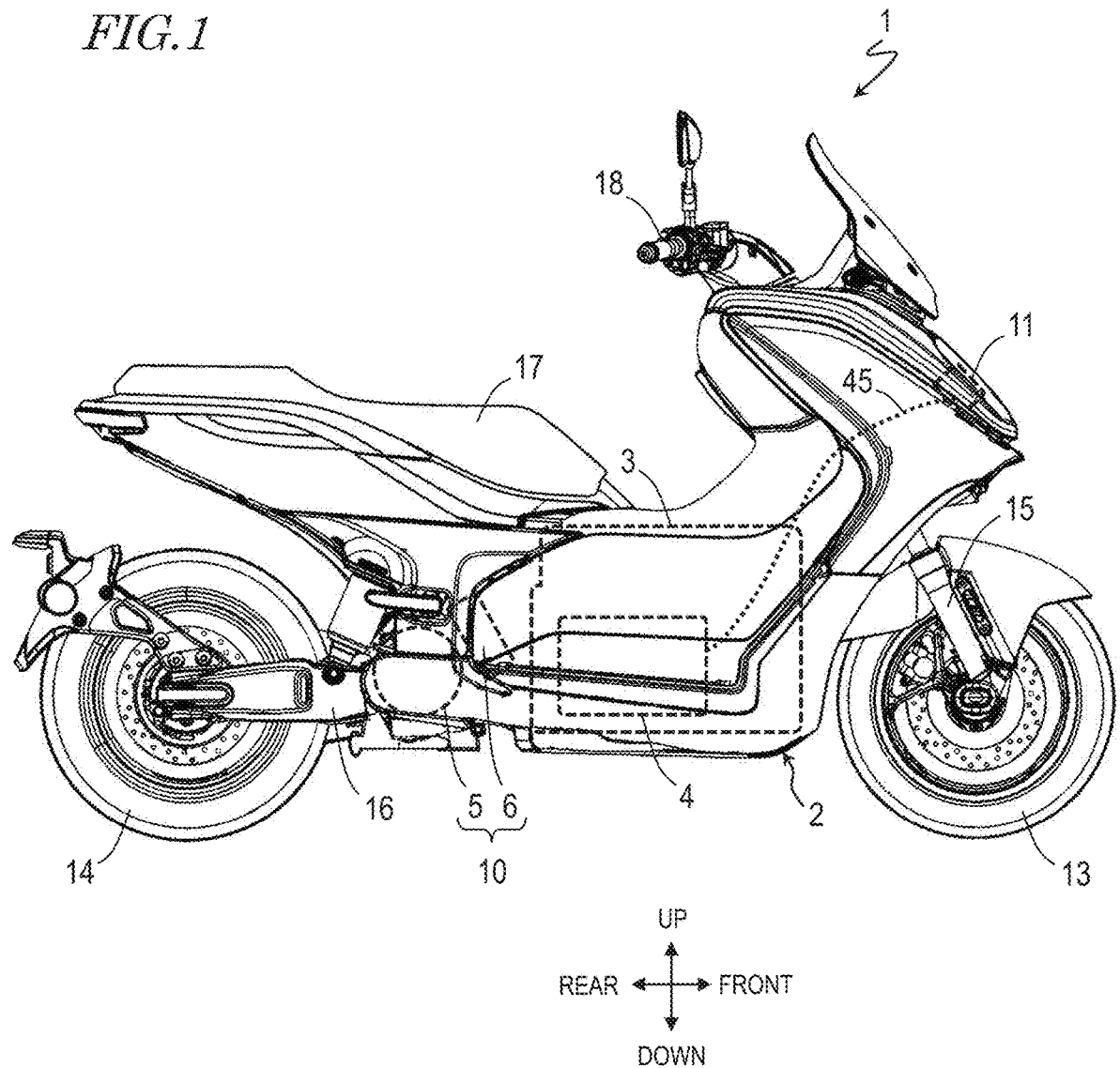
FIG. 1 is a right side view showing an electric vehicle 1 according to a preferred embodiment of the present invention.

Hereinbelow, with reference to the attached drawings, preferred embodiments of the present invention are described. Like components are denoted by like reference numerals, and redundant description of such components is omitted. In the following description, the front, rear, top, bottom, right, and left correspond respectively to the front, rear, top, bottom, right, and left as viewed from a rider seated on a seat of an electric vehicle. Note that the preferred embodiments described hereinbelow are merely examples, and thus the present invention is not limited to the preferred embodiments described below.

FIG. 1 is a right side view showing an electric vehicle 1 according to a preferred embodiment of the present invention. The electric vehicle 1 may be a straddled electric vehicle, for example. In the example illustrated in FIG. 1, the electric vehicle 1 is a two-wheeled electric vehicle of a scooter type. Note that the electric vehicle 1 is not limited to the scooter-type two-wheeled electric vehicle exemplified herein. The electric vehicle 1 may be two-wheeled electric vehicles of other types such as what is called an on-road type, an off-road type, and a moped type. A straddled electric vehicle refers to an arbitrary vehicle that the rider rides in a straddling manner, and thus is not limited to two-wheeled vehicles. The straddled electric vehicle 1 may be a three-wheeled vehicle (LMW) of a type whose direction of travel is changed as the vehicle body is tilted, etc., or any other straddled electric vehicle such as an ATV (All Terrain Vehicle). The electric vehicle 1 may be a vehicle with four or more wheels.

As shown in FIG. 1, the two-wheeled electric vehicle 1 includes a vehicle body 2, a battery 3, an onboard charger 4, a drive unit 10, a front wheel 13, a rear wheel 14, and steering handles 18.

The vehicle body 2 has a structure including a body frame and a body cover. A front portion of the vehicle body 2 supports front forks 15. The steering handles 18 are attached to an upper portion of the front forks 15. The front wheel 13 is rotatably supported at lower end portions of the front forks 15. A rear portion of the vehicle body 2 swingingly supports a swingarm 16. The rear wheel 14 is rotatably supported by the swingarm 16. In this example, the rear wheel 14 is a drive wheel, and the front wheel 13 is a driven wheel. A seat 17 on which the rider is seated is provided at an upper portion of the vehicle body 2.

The battery 3 is between the front wheel 13 and the rear wheel 14 along the front-rear direction of the vehicle 1. The drive unit 10 is rearward of the battery 3. The drive unit 10 includes an electric motor 5 and a motor control unit (MCU)

6 that controls operation of the electric motor 5. The battery 3 supplies electric power to activate the electric motor 5. The MCU 6 generates a driving current from an output current of the battery 3, and outputs this driving current to the electric motor 5. Rotation caused by the electric motor 5 is transmitted to the rear wheel 14 via, for example, a motive power transmission mechanism of, for example, a belt-drive type to cause the two-wheeled electric vehicle 1 to travel. The rotation caused by the electric motor 5 may be transmitted to the rear wheel 14 via a motive power transmission mechanism of a chain-drive type or a shaft-drive type.

Figure 2:
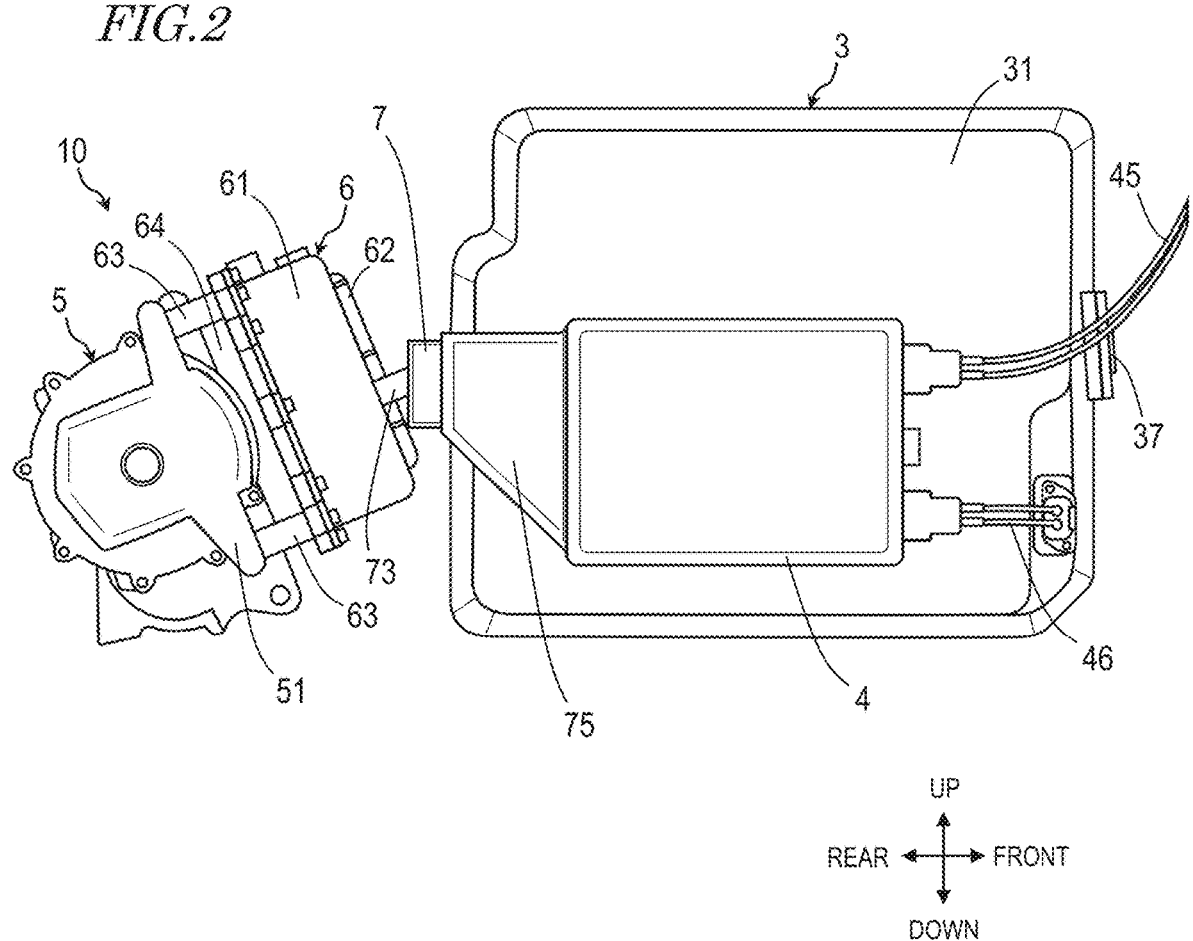
FIG. 2 is a right side view showing a battery 3, an onboard charger 4, and a drive unit 10 according to a preferred embodiment of the present invention.

The onboard charger 4 is to the right of the battery 3. A charging port 11 is provided in the front portion of the vehicle body 2. A connector that is provided on a cable extending from an external power source is attachable to or detachable from the charging port 11. The charging port 11 is connected to the onboard charger 4 via electric wires 45. When charging the battery 3, an AC current output from the external power source is supplied to the onboard charger 4 through the charging port 11. The onboard charger 4 converts the AC current to DC current, and outputs the DC current to the battery 3 to charge the battery 3. The DC current output by the onboard charger 4 is supplied to the battery 3 via, for example, electric wires 46 (FIG. 2). Alternatively, the charging port 11 may have DC current supplied thereto from an external power source. In this case, the onboard charger 4 converts an input voltage to a DC voltage that is suitable to charge the battery 3, and outputs this DC voltage to the battery 3.

Figure 3:
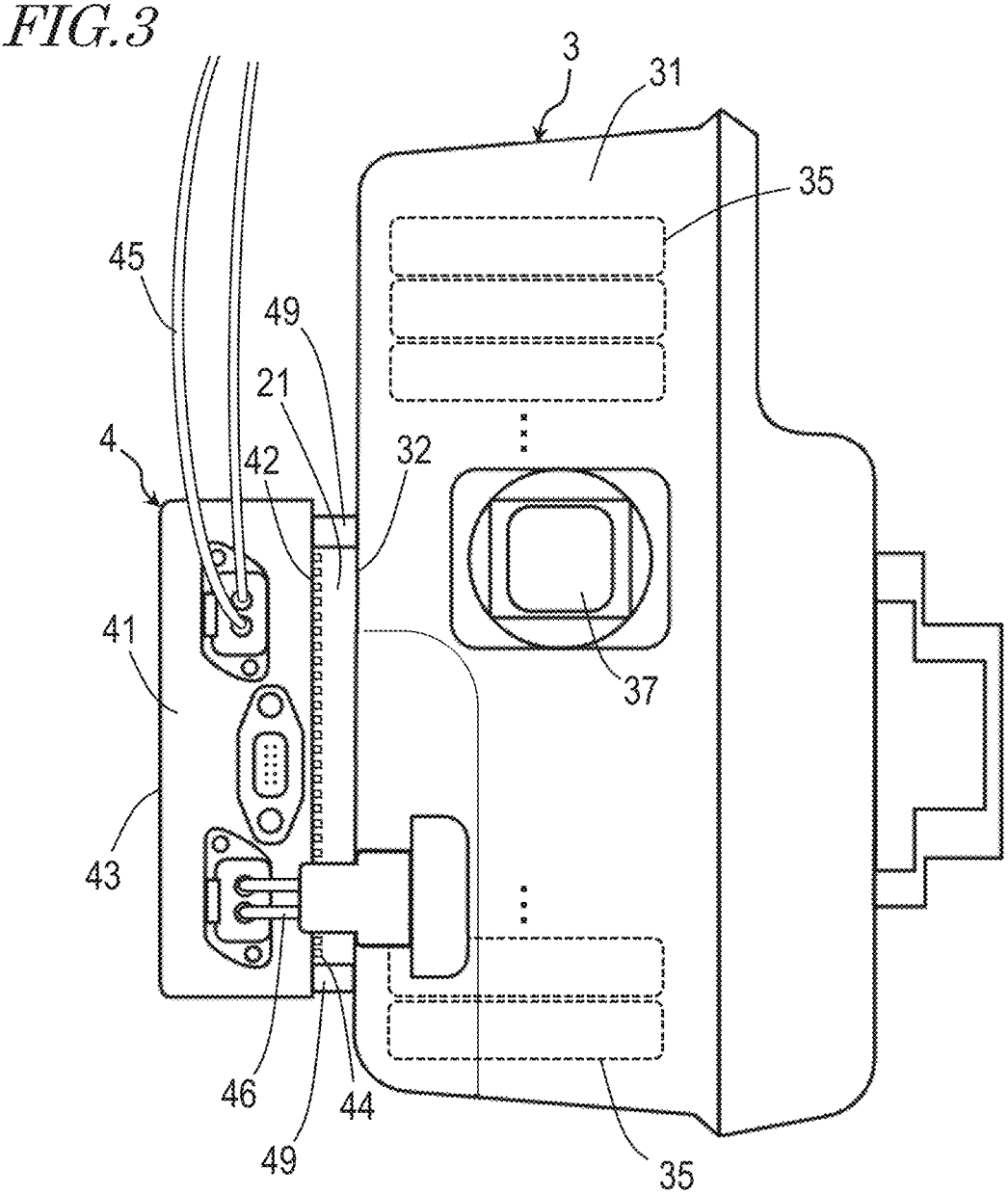
FIG. 3 is a front view showing the battery 3 and the onboard charger 4 according to a preferred embodiment of the present invention.

FIG. 2 is a right side view showing the battery 3, the onboard charger 4, and the drive unit 10. FIG. 3 is a front view showing the battery 3 and the onboard charger 4.

With reference to FIG. 3, the battery 3 includes a plurality of battery cells 35 and a battery casing 31 that houses the plurality of battery cells 35. The onboard charger 4 is opposed to and spaced apart from an outer surface of the battery casing 31 so that an air flow path 21 exists between the onboard charger 4 and the outer surface of the battery casing 31. In the example shown in FIG. 3, brackets 49 are attached to the battery casing 31 to support the onboard charger 4 from above and from below such that a gap is created between the battery casing 31 and the onboard charger 4. This gap serves as the air flow path 21. More specifically, the housing 41 of the onboard charger 4 includes a wall 42 (first wall) opposed to (i.e., facing) the battery casing 31. The battery casing 31 includes a wall 32 (second wall) opposed to the wall 42 of the onboard charger 4. The air flow path 21 is created between the wall 42 of the onboard charger 4 and the wall 32 of the battery casing 31. Each of the walls 42 and 32 may be made of a highly thermally conductive material (e.g., a metal such as aluminum).

The brackets 49 may be monolithic (i.e., unitary) with the battery casing 31 or the housing 41 of the onboard charger 4, or may be separate components from the battery casing 31 and the housing 41 of the onboard charger 4.

With reference to FIG. 2, a cooling fan 7 is rearward of the onboard charger 4 to generate a flow of air passing through the air flow path 21 (FIG. 3) between the onboard charger 4 and the battery casing 31. The cooling fan 7 may include an impeller and an electric motor to rotate the impeller, for example, and sucks the air in front of the cooling fan 7 and discharges it rearward. By sucking the air within the air flow path 21, the cooling fan 7 generates a flow of air passing through the air flow path 21.

The wall 42 of the onboard charger 4 is schematically shaped as a flat plane or a gently curved surface, and does not include any portion that presents a significant drag against the flow of air. Similarly, the portion of the wall 32 of the battery casing 31 that is opposed to the wall 42 is schematically shaped as a flat plane or a gently curved surface, and does not include any portion that presents a significant drag against the flow of air.

Because the width along the right-left direction of the air flow path 21 is small relative to the area of the portion at which the wall 42 and the wall 32 are opposed to each other, a substantial portion of the air passing through the air flow path 21 is in contact with the wall 42 and the wall 32, thus enabling efficient cooling. As one example, the air flow path 21 may have a length along the front-rear direction of about 20 to about 30 cm, a length along the top-bottom direction of about 10 to about 20 cm, and a width along the right-left direction of about 0.5 to about 3 cm. These values are mere examples, and preferred embodiments of the present invention are not limited thereto.

With reference to FIG. 3, a front portion of the air flow path 21 is open to the outside of the air flow path 21. The front portion of the air flow path 21 may be exposed through the vehicle body 2 to the outside. This allows a portion of the wind received from the front of the two-wheeled electric vehicle 1 during travel of the two-wheeled electric vehicle 1 to be taken into the air flow path 21, this portion of the wind being utilized for air cooling.

In the example shown in FIG. 2, a duct 75 leading the air in the air flow path 21 to the cooling fan 7 is located at a rear portion of the onboard charger 4. FIG. 4 is a diagram showing a cross section of the duct 75 along the front-rear and top-bottom directions. The duct 75 has a barrel shape such that its width along the top-bottom direction gradually decreases from its front portion toward its rear portion. The front portion of the duct 75 covers the rear end of the air flow path 21. A portion of the cooling fan 7 is inserted in a rear portion of the duct 75. The air within the air flow path 21 is led to the cooling fan 7 through the duct 75. Arrows 76 indicate a flow of air that is led from the air flow path 21 to the cooling fan 7. With this flow of air, the heat generated from the battery 3 and the onboard charger 4 is efficiently released to the outside.

In the present preferred embodiment, the onboard charger 4 and the battery casing 31 are opposed to each other, and the gap between the onboard charger 4 and the battery casing 31 is utilized as the air flow path 21 for forced air cooling, such that both of the onboard charger 4 and the battery 3 are cooled by using the same cooling fan 7 thus saving space. Especially in the case of a two-wheeled electric vehicle, a large number of components need to be provided within a limited space in a vehicle body, and therefore the space saving is significantly advantageous. Allowing both of the onboard charger 4 and the battery 3 to be cooled with the same cooling fan 7 also reduces costs.

Because the duct 75 is provided between the air flow path 21 and the cooling fan 7, the cooling fan 7 is able to efficiently suck the air within the air flow path 21, thus allowing the onboard charger 4 and the battery 3 to be efficiently cooled.

With reference to FIG. 3, a plurality of radiation fins 44 are provided on the wall 42 of the onboard charger 4 facing the air flow path 21. Because the radiation fins 44 are provided on the wall 42, the heat generated from the onboard charger 4 is efficiently released. Note that a radiation fin(s) may also be provided on the wall 32 of the battery casing 31 facing the air flow path 21.

The battery casing 31 and the housing 41 of the onboard charger 4 may each be waterproof. This prevents rainwater or the like from intruding inside the battery 3 and inside the onboard charger 4. With reference to FIG. 3, a pressure valve 37 is provided on the battery casing 31. When the pressure in the battery casing 31 rises, the pressure valve 37 may open to let the air within the battery casing 31 release to the outside. A pressure valve may also be provided on the housing 41 of the onboard charger 4.

Although the above description illustrates that the battery 3 and the onboard charger 4 are cooled by the single cooling fan 7, the cooling fan 7 may additionally cool the MCU 6.

With reference to FIG. 2 and FIG. 4, the MCU 6 is rearward of the cooling fan 7. A plurality of radiation fins 62 are provided on a portion of a housing 61 of the MCU 6 that is opposed to the cooling fan 7. In the example shown in FIG. 2, the cooling fan 7 is attached to the housing 61 of the MCU 6 via a bracket 73.

The cooling fan 7 sucks the air in front of the cooling fan 7 and discharges the air rearward. Along a direction of the flow of air generated by the cooling fan 7, the air flow path 21 is located upstream of the cooling fan 7, and the MCU 6 is located downstream of the cooling fan 7. By sucking the air within the air flow path 21 and discharging it rearward, the cooling fan 7 generates a flow of air blowing toward the MCU 6. In FIG. 4, arrows 77 indicate a flow of air blowing from the cooling fan 7 toward the MCU 6. As the flow of air generated by the cooling fan 7 strikes the MCU 6, the heat generated from the MCU 6 is efficiently released to the outside.

During travel of the two-wheeled electric vehicle 1, the MCU 6 is generally higher in temperature than the battery 3. Moreover, during travel of the two-wheeled electric vehicle 1, the onboard charger 4 is not used and therefore the onboard charger 4 does not generate heat. Therefore, the MCU 6 is cooled even by receiving the flow of air that is generated by the cooling fan 7 sucking the air existing in the air flow path 21 between the battery 3 and the onboard charger 4.

On the other hand, during charging of the battery 3, the onboard charger 4 generates heat, but the two-wheeled electric vehicle 1 is parked and the MCU 6 is not operating, and thus there is no need to cool the MCU 6. Therefore, even if the flow of air that is generated by the cooling fan 7 sucking the air existing in the air flow path 21 strikes the MCU 6, the MCU 6 will not be affected.

Thus, efficient cooling is achieved during travel of the two-wheeled electric vehicle 1 and during charging of the battery 3, even by using the same cooling fan 7 for the battery 3, the onboard charger 4, and the MCU 6. By cooling the battery 3, the onboard charger 4, and the MCU 6 with the same cooling fan 7, space is saved and costs are reduced.

Although it was mentioned that a portion of the cooling fan 7 is inserted in a rear portion of the duct 75, a gap may exist between the cooling fan 7 and the rear portion of the duct 75, as shown in FIG. 4. Because of the gap, the cooling fan 7 is able to suck the external air (other than the air within the air flow path 21) and discharge it. Because of the ability to discharge a mixture of the air within the air flow path 21 and the cold external air, the cooling fan 7 is able to efficiently cool the MCU 6.

Next, an example construction that allows the heat generated by the battery 3 and the onboard charger 4 to be released more efficiently will be described.

Figure 5:
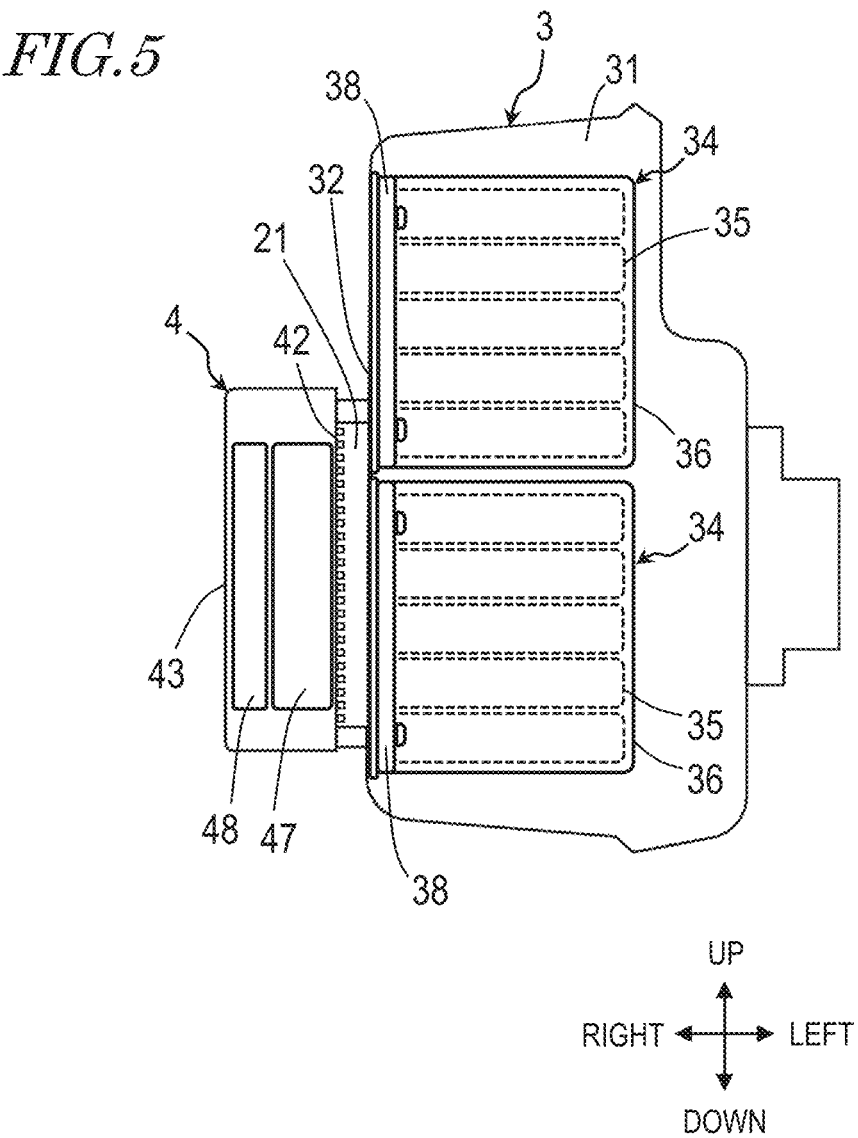
FIG. 5 is a diagram showing the inside of each of the battery 3 and the onboard charger 4 according to a preferred embodiment of the present invention.

FIG. 5 is a diagram showing the inside of each of the battery 3 and the onboard charger 4. In the example shown in FIG. 5, battery modules 34 are located in the battery casing 31, and each battery module 34 includes a plurality of battery cells 35 which are connected to one another. On the right side of a case 36 of the battery module 34, a heat-transmitting member 38 that is made of a highly thermally conductive material (e.g., a metal such as aluminum) is provided. The heat-transmitting member 38 may be monolithic with the case 36. A right portion of the heat-transmitting member 38 is attached to the wall 32 of the battery casing 31, allowing the heat generated within the battery module 34 to be efficiently conducted to the wall 32. Since the wall 32 faces the air flow path 21, allowing heat to be conducted to the wall 32 through the heat-transmitting member 38 permits efficient heat radiation.

The onboard charger 4 includes a power circuit 47 to convert an externally-input AC current into DC current and a control circuit 48 to control the operation of the power circuit 47. The power circuit 47 includes, e.g., a rectifier circuit, a smoothing circuit, and a switching element(s), and generates a large amount of heat.

The housing 41 of the onboard charger 4 further includes a wall 43 (third wall) located at an opposite side of the side that is opposed to the wall 32 of the battery 3. Within the onboard charger 4, the power circuit 47 is located closer to the wall 42 than to the wall 43. For example, a substrate on which to mount the power circuit 47 may be located closer to the wall 42 than to the wall 43 within the onboard charger 4. The wall 42 faces the air flow path 21. By locating the power circuit 47 that generates a large amount of heat at a position close to the air flow path 21, efficient heat radiation is performed.

FIG. 6 is a diagram showing another example of heat-transmitting members included in the battery 3. Heat-transmitting members 38a shown in FIG. 6 each have the shape of a plate extending along the top-bottom and right-left directions, and is made of a highly thermally conductive material (e.g., a metal such as aluminum). A right portion of the heat-transmitting member 38a is attached to the wall 32. Heat generated inside the battery 3 is conducted to the wall 32 via the heat-transmitting members 38a. Since the wall 32 faces the air flow path 21 allowing heat to be conducted to the wall 32 through the heat-transmitting members 38a permits efficient heat radiation.

Next, the drive unit 10 will be described with reference to FIG. 2.

The drive unit 10 according to the present preferred embodiment has an integrated mechanical and electrical structure in which the MCU 6 is attached to the electric motor 5. With the integrated mechanical and electrical structure, the high-voltage wiring between the MCU 6 and the electric motor 5 is shortened, thus reducing costs and weight. On the other hand, since a large amount of heat is generated from the electric motor 5, it is desirable to reduce the amount of heat that is transmitted from the electric motor 5 to the MCU 6 in the integrated mechanical and electrical structure.

In the example shown in FIG. 2, the MCU 6 is attached to the housing 51 of the electric motor 5 via brackets 63. The brackets 63 are shaped like columns extending from both ends of the MCU 6 toward the electric motor 5, such that a gap 64 is created between the MCU 6 and the electric motor 5. Because the gap 64 exists between the MCU 6 and the electric motor 5 in the integrated mechanical and electrical structure, the amount of heat that is transmitted from the electric motor 5 to the MCU 6 is reduced.

The length of the gap 64 along the direction from the electric motor 5 toward the MCU 6 may be, e.g., about 5 mm to about 30 mm. These values are mere examples, and preferred embodiments of the present invention are not limited.

The MCU 6 may include an inverter circuit, a DC-DC converter, and the like, and the MCU 6 itself also generates heat. When the temperature in the MCU 6 reaches a limit temperature or above, the MCU 6 may lower its output in order to reduce the generated heat. In the present preferred embodiment, the MCU 6 receives forced air cooling with the cooling fan 7, and also the amount of heat that is transmitted from the electric motor 5 to the MCU 6 is reduced such that the temperature in the MCU 6 is prevented from reaching the limit temperature or above. Moreover, since heat radiation of the MCU 6 is efficiently performed, the number of switching elements included in the MCU 6 is reduced, and a reduced cost of the MCU 6 is achieved. For example, in the inverter circuit of the MCU 6, a plurality of switching elements may be used in parallel connection in order to reduce the current flowing in each switching element. In the present preferred embodiment, since heat radiation of the MCU 6 is efficiently performed, a greater amount of heat may be generated in each switching element meaning that a larger current may flow in each switching element, thus making it possible to reduce the number of switching elements.

The brackets 63 to attach the MCU 6 to the electric motor 5 may be monolithic with the housing 61 of the MCU 6, or may be separate components from the housing 61.

Although the above-described preferred embodiments are illustrated such that the cooling fan 7 is rearward of the air flow path 21, the cooling fan 7 may alternatively be forward of the air flow path 21. Introducing the air discharged from the cooling fan 7 into the air flow path 21 will also allow the battery 3 and the onboard charger 4 to be cooled.

Although the above-described preferred embodiments are illustrated such that the drive unit 10 has an integrated mechanical and electrical structure, the drive unit 10 may not have an integrated mechanical and electrical structure, and the electric motor 5 and the MCU 6 may be isolated from each other.

Although the above-described preferred embodiments are illustrated such that the MCU 6 is rearward of the battery 3 and the onboard charger 4, the MCU 6 may alternatively be forward of the battery 3 and the onboard charger 4.

Although the above-described preferred embodiments are illustrated such that the onboard charger 4 is attached to the battery casing 31, the onboard charger 4 may alternatively be attached to the body frame. In this case, too, the onboard charger 4 may be opposed to the outer surface of the battery casing 31 so that the air flow path 21 is created between itself and the outer surface of the battery casing 31, such that both of the onboard charger 4 and the battery 3 are cooled with the same cooling fan 7. Although the cooling fan 7 is illustrated as being attached to the housing 61 of the MCU 6, the cooling fan 7 may alternatively be attached to the body frame.

Thus, illustrative preferred embodiments of the present invention have been described.

An electric vehicle 1 according to a preferred embodiment of the present invention includes a wheel 14 an electric motor 5 to drive the wheel 14 a battery 3 to supply electric power to the electric motor 5 and including a plurality of battery cells 35 and a battery casing 31 that houses the plurality of battery cells 35, an onboard charger 4 to charge the battery 3 and being opposed to and spaced apart from an outer surface of the battery casing 31 so that an air flow path 21 exists between the onboard charger 4 and the outer surface of the battery casing 31, and a cooling fan 7 to generate a flow of air passing through the air flow path 21 between the onboard charger 4 and the outer surface of the battery casing 31.

The onboard charger 4 and the outer surface of the battery casing 31 are opposed to each other, and the gap between the onboard charger 4 and the outer surface of the battery casing 31 is utilized as the air flow path 21 for forced air cooling, such that both of the onboard charger 4 and the battery 3 are cooled by using the same cooling fan 7, thus saving space. Especially in the case of an electric vehicle 1, a large number of components need to be provided within a limited space in a vehicle body, and therefore the space saving is significantly advantageous. Allowing both of the onboard charger 4 and the battery 3 to be cooled with the same cooling fan 7 also reduces costs.

According to a preferred embodiment of the present invention, the electric vehicle 1 may further include an MCU 6 to generate a driving current to be supplied to the electric motor 5 from an output current of the battery 3, and the cooling fan 7 may generate a flow of air blowing toward the MCU 6.

By cooling the onboard charger 4, the battery 3, and the MCU 6 with the same cooling fan 7, space is saved and costs are reduced.

According to a preferred embodiment of the present invention, along a direction of the flow of air generated by the cooling fan 7, the air flow path 21 between the onboard charger 4 and the battery 3 may be located upstream of the cooling fan 7, and the MCU 6 may be located downstream of the cooling fan 7; and the cooling fan 7 may suck air within the air flow path 21 to generate the flow of air blowing toward the MCU 6.

During travel of the electric vehicle 1, the MCU 6 is generally higher in temperature than the battery 3. Moreover, during travel of the electric vehicle 1, the onboard charger 4 is not used and therefore the onboard charger 4 does not generate heat. Therefore, the MCU 6 is cooled even by receiving the flow of air that is generated by the cooling fan 7 sucking the air existing in the air flow path 21 between the battery 3 and the onboard charger 4.

On the other hand, during charging of the battery 3, the onboard charger 4 generates heat, but the electric vehicle 1 is parked, and thus there is no need to cool the MCU 6. Therefore, even if the flow of air that is generated by the cooling fan 7 sucking the air existing in the air flow path 21 between the onboard charger 4 and the battery 3 strikes the MCU 6, the MCU 6 will not be affected.

Thus, efficient cooling is achieved during travel of the electric vehicle 1 and during charging of the battery 3, even by using the same cooling fan 7 for the battery 3, the onboard charger 4, and the MCU 6.

According to a preferred embodiment of the present invention, the electric vehicle 1 may further include a duct 75 to lead air in the air flow path 21 between the onboard charger 4 and the battery 3 to the cooling fan 7.

The cooling fan 7 is able to efficiently suck the air within the air flow path 21 between the onboard charger 4 and the battery 3, thus allowing the onboard charger 4 and the battery 3 to be efficiently cooled.

According to a preferred embodiment of the present invention, the onboard charger 4 may include a housing 41 including a first wall 42 that is opposed to the battery casing 31; and the battery casing 31 may include a second wall 32 that is opposed to the first wall 42 so that the air flow path 21 is created between the second wall 32 and the first wall 42.

By creating the air flow path 21 for forced air cooling between the wall 42 of the onboard charger 4 and the wall 32 of the battery 3 being opposed to each other, both of the onboard charger 4 and the battery 3 are cooled with the same cooling fan 7.

According to a preferred embodiment of the present invention, the onboard charger 4 may include a power circuit 47 to convert an externally-input AC current into DC current; the housing 41 of the onboard charger 4 may further include a third wall 43 located at an opposite side of a side that is opposed to the second wall 32 of the battery 3; and, within the onboard charger 4, the power circuit 47 may be closer to the first wall 42 than to the third wall 43.

By locating the power circuit 47 that generates a large amount of heat close to the air flow path 21 between the onboard charger 4 and the battery 3, an efficient heat radiation is performed.

According to a preferred embodiment of the present invention, the battery 3 may further include a heat-transmitting member 38 to conduct heat generated inside the battery 3 to the second wall 32.

Allowing heat generated inside the battery 3 to be conducted to the second wall 32 permits efficient heat radiation.

According to a preferred embodiment of the present invention, each of the housing 41 of the onboard charger 4 and the battery casing 31 may be waterproof.

This prevents rainwater or the like from intruding inside the onboard charger 4 and inside the battery 3.

According to a preferred embodiment of the present invention, a front portion of the air flow path 21 between the onboard charger 4 and the battery 3 may be open to an outside of the air flow path 21.

This allows a portion of the wind received from the front of the electric vehicle 1 during travel of the electric vehicle 1 to be taken into the air flow path 21, this portion of the wind being utilized for air cooling.

According to a preferred embodiment of the present invention, the MCU 6 may be attached to the electric motor 5 with a gap 64 existing between a portion of the MCU 6 and the electric motor 5.

With an integrated mechanical and electrical structure in which the MCU 6 is attached to the electric motor 5, the high-voltage wiring between the MCU 6 and the electric motor 5 is shortened, thus reducing costs and weight. Although a large amount of heat is generated from the electric motor 5, because the gap 64 exists between the MCU 6 and the electric motor 5 in this integrated mechanical and electrical structure, the amount of heat that is transmitted from the electric motor 5 to the MCU 6 is reduced.

According to a preferred embodiment of the present invention, the MCU 6 may be attached to the electric motor 5 via a bracket(s) 63.

By using the bracket(s) 63, the MCU 6 is attached to the electric motor 5 so that the gap 64 exists between a portion of the MCU 6 and the electric motor 5.

The electric vehicle 1 according to a preferred embodiment of the present invention may be a straddled electric vehicle 1.

In the straddled electric vehicle 1 a large number of components need to be provided within a limited space in the vehicle body, and space is saved and costs are reduced with respect to cooling structures for the components.

Preferred embodiments of the present invention are useful particularly in the field of electric vehicles that utilize an electric motor as their driving source.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric vehicle comprising:
a wheel;
an electric motor to drive the wheel;
a battery to supply electric power to the electric motor and including a plurality of battery cells and a battery casing that houses the plurality of battery cells;
an onboard charger to charge the battery and opposed to and spaced apart from an outer surface of the battery casing so that an air flow path exists between the onboard charger and the outer surface of the battery casing; and
a cooling fan to generate a flow of air passing through the air flow path between the onboard charger and the outer surface of the battery casing; wherein
the onboard charger receives electric power from an external power source and supplies the electric power to the battery.

2. The electric vehicle of claim 1, further comprising:
a controller to generate a driving current to be supplied to the electric motor from an output current of the battery; wherein
the cooling fan generates the flow of air to blow toward the controller.

3. The electric vehicle of claim 2, wherein
along a direction of the flow of air generated by the cooling fan, the air flow path between the onboard charger and the battery is located upstream of the cooling fan, and the controller is located downstream of the cooling fan; and
the cooling fan sucks in air within the air flow path to generate the flow of air to blow toward the controller.

4. The electric vehicle of claim 2, wherein the controller is attached to the electric motor with a gap existing between the controller and the electric motor.

5. The electric vehicle of claim 4, wherein the controller is attached to the electric motor via a bracket.

6. The electric vehicle of claim 1, further comprising a duct to lead air in the air flow path between the onboard charger and the battery to the cooling fan.

7. The electric vehicle of claim 1, wherein
the onboard charger includes a housing including a first wall that is opposed to the battery casing; and
the battery casing includes a second wall that is opposed to the first wall so that the air flow path is created between the second wall and the first wall.

8. The electric vehicle of claim 7, wherein
the onboard charger includes a power circuit to convert an externally-input AC current from the external power source into DC current;
the housing of the onboard charger further includes a third wall located at an opposite side of a side that is opposed to the second wall of the battery; and
within the onboard charger, the power circuit is closer to the first wall than to the third wall.

9. The electric vehicle of claim 7, wherein the battery further includes a heat transmitter to conduct heat generated inside the battery to the second wall.

10. The electric vehicle of claim 7, wherein each of the housing of the onboard charger and the battery casing is waterproof.

11. The electric vehicle of claim 1, wherein a front portion of the air flow path between the onboard charger and the battery is open to an outside of the air flow path.

12. The electric vehicle of claim 1, wherein the electric vehicle is a straddled electric vehicle.

13. An electric vehicle comprising:
a wheel;
an electric motor to drive the wheel;
a battery to supply electric power to the electric motor and including a plurality of battery cells and a battery casing that houses the plurality of battery cells;
an onboard charger to charge the battery and opposed to and spaced apart from an outer surface of the battery casing so that an air flow path exists between the onboard charger and the outer surface of the battery casing; and
a cooling fan to generate a flow of air passing through the air flow path between the onboard charger and the outer surface of the battery casing; wherein
the air flow path between the onboard charger and the outer surface of the battery is located upstream of the cooling fan.

14. An electric vehicle comprising:
a wheel;
an electric motor to drive the wheel;
a battery to supply electric power to the electric motor and including a plurality of battery cells and a battery casing that houses the plurality of battery cells;
an onboard charger to charge the battery and opposed to and spaced apart from an outer surface of the battery casing so that an air flow path exists between the onboard charger and the outer surface of the battery casing;
a cooling fan to generate a flow of air passing through the air flow path between the onboard charger and the outer surface of the battery casing; and
a duct to lead air in the air flow path between the onboard charger and the battery to the cooling fan.

15. An electric vehicle comprising:
a wheel;
an electric motor to drive the wheel;
a battery to supply electric power to the electric motor and including a plurality of battery cells and a battery casing that houses the plurality of battery cells;
an onboard charger to charge the battery and opposed to and spaced apart from an outer surface of the battery casing so that an air flow path exists between the onboard charger and the outer surface of the battery casing; and
a cooling fan to generate a flow of air passing through the air flow path between the onboard charger and the outer surface of the battery casing; wherein
the onboard charger includes a housing including a first wall that is opposed to the battery casing;
the battery casing includes a second wall that is opposed to the first wall so that the air flow path is created between the second wall and the first wall;
the onboard charger includes a power circuit to convert an externally-input AC current into DC current;
the housing of the onboard charger further includes a third wall located at an opposite side of a side that is opposed to the second wall of the battery; and
within the onboard charger, the power circuit is closer to the first wall than to the third wall.

16. An electric vehicle comprising:
a wheel;
an electric motor to drive the wheel;
a battery to supply electric power to the electric motor and including a plurality of battery cells and a battery casing that houses the plurality of battery cells;
an onboard charger to charge the battery and opposed to and spaced apart from an outer surface of the battery casing so that an air flow path exists between the onboard charger and the outer surface of the battery casing; and
a cooling fan to generate a flow of air passing through the air flow path between the onboard charger and the outer surface of the battery casing; wherein
the cooling fan generates the flow of air passing through the air flow path between the onboard charger and the outer surface of the battery casing while the electric vehicle is moving.

* * * * *